(12) United States Patent
Godfrin et al.

(10) Patent No.: US 11,253,976 B2
(45) Date of Patent: Feb. 22, 2022

(54) THERMALLY PROTECTIVE NARROW REVERSE ACTION TWEEZERS

(71) Applicant: NANOSOFT, LLC., Coventry, RI (US)

(72) Inventors: Michael Philip Godfrin, Narragansett, RI (US); Michael Asher Franzblau, Scituate, RI (US)

(73) Assignee: NANOSOFT, LLC., Coventry, RI (US)

( * ) Notice: Subject to any disclaimer, the term of this patent is extended or adjusted under 35 U.S.C. 154(b) by 237 days.

(21) Appl. No.: 16/515,822

(22) Filed: Jul. 18, 2019

(65) Prior Publication Data
US 2020/0023497 A1 Jan. 23, 2020

Related U.S. Application Data

(60) Provisional application No. 62/737,002, filed on Sep. 26, 2018, provisional application No. 62/700,485, filed on Jul. 19, 2018.

(51) Int. Cl.
*B25B 9/02* (2006.01)
*G01N 1/42* (2006.01)

(52) U.S. Cl.
CPC . *B25B 9/02* (2013.01); *G01N 1/42* (2013.01)

(58) Field of Classification Search
CPC .......... B25B 9/02; G01N 1/42; H01J 2237/26
See application file for complete search history.

(56) References Cited

U.S. PATENT DOCUMENTS

| | | | |
|---|---|---|---|
| 2004/0135388 A1* | 7/2004 | Sgobero | A61B 34/72 294/100 |
| 2005/0264019 A1* | 12/2005 | Muramatsu | B25B 9/00 294/99.1 |
| 2010/0241119 A1* | 9/2010 | Bayat | A61B 18/1442 606/51 |
| 2012/0322021 A1* | 12/2012 | Cannon | A61C 19/004 433/24 |
| 2014/0300121 A1* | 10/2014 | Schryver | B25B 9/02 294/99.2 |
| 2018/0220774 A1* | 8/2018 | Hatch | A46B 5/0012 |

FOREIGN PATENT DOCUMENTS

GB 949012 A * 2/1964 ............... B25B 9/02

* cited by examiner

*Primary Examiner* — Stephen A Vu
(74) *Attorney, Agent, or Firm* — Adler Pollock & Sheehan P.C (57) ABSTRACT

A system includes thermally protective, narrow reverse-action tweezers with a self-aligning clamp for frictionless positioning with secure connection to a sample preparation system plunger for cryogenic transmission electron microscopy.

12 Claims, 6 Drawing Sheets

THERMALLY PROTECTIVE NARROW REVERSE ACTION TWEEZERS

CROSS REFERENCE TO RELATED APPLICATIONS

This application claims benefit from U.S. Provisional Patent Application Ser. No. 62/700,485, filed Jul. 19, 2018, and U.S. Provisional Patent Application Ser. No. 62/737,002, filed Sep. 26, 2018, which are incorporated by reference in their entireties.

BACKGROUND OF THE INVENTION

The present invention relates generally to cryogenic transmission electron microscopy, and more particularly to thermally protective narrow action tweezers.

In general, cryo-electron microscopy (cryo-EM) is a type of transmission electron microscopy that enables a specimen of interest to be viewed at cryogenic temperatures. The cryo-electron microscope has become a valuable tool for viewing and studying the structures of various biological molecules.

In cryo-electron microscopy the sample under observation is usually frozen (frozen-hydrated) for preservation purposes. For example, a very thin slide of the specimen may be rapidly plunged into a liquid ethane bath and viewed in their natural state. Solvents like water or a salt solution is used to ensure that the sample remains stable.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a system including thermally protective, narrow reverse-action tweezers with a self-aligning clamp for frictionless positioning with secure connection to a sample preparation system plunger for cryogenic transmission electron microscopy.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention is a tweezer assembly for use in a preparation of samples for cryogenic transmission electron microscopy. More specifically, the present invention is a spring loaded clamp for tweezers that provides for user-friendly, self-aligning attachment to a shaft of a cryogenic preparation robot, which drives the sample held by the tweezers into a cryogen. Furthermore, the present invention includes the addition of grips to the tweezers that provide thermal insulation for user comfort when using the tweezers at cryogenic conditions. Moreover, the present invention includes custom modification of reverse-action tweezers for compatibility and use with the specifications of technologies used for the preparation of samples for cryogenic transmission electron microscopy.

As described above, cryogenic transmission electron microscopy ("cryo-TEM") relies on cryogenic sample preparation of fluidic samples prior to imaging with a TEM, which synergistically provides native images of hydrated materials (e.g., proteins, enzymes, nanomaterial suspensions, and so forth) with the resolution advantages of TEM. Cryogenic sample preparation requires the vitrification of the fluidic material, where vitrification is the freezing of a water-based sample quick enough such that water molecules do not crystallize but rather remain amorphous; crystallization of water would result in damage to the molecules/solute/nanomaterials of interest in solution or suspension and also result in poor images due to the nature of water crystals. Current methods used to vitrify samples for cryoTEM have been to pipette a fluidic sample onto a TEM sample grid, blot the grid with blotting paper for a finite time period to remove excess sample, and then quickly plunge the grid into a liquid cryogen. The blot is used to remove sample volume, resulting in a fluid layer thin enough to vitrify when plunged into the cryogen. In order to provide repeatability, blotting sample preparation systems are utilized. Tweezers are utilized to hold onto the sample grid, and the tweezers are attached to the end of a plunging arm. The tweezers with the sample grid are located within a semi-closed box, within which environmental parameters can be controlled, and the user pipettes fluidic sample onto the grid and the blotting action to thin the fluidic sample is conducted. Post-blotting the plunging arm plunges the TEM sample grid through a hole in the floor of the box and into a cup of liquid cryogen to vitrify the sample. The sample grid is then transferred with the tweezers into a grid storage container, which is immersed in liquid nitrogen, for long term storage until the grid is to be imaged with a TEM.

Tweezers utilized previously in conjunction with many sample preparation systems for cryo-TEM have relied on a dovetail for mating between tweezers and the plunger, which drives the sample substrate (held by the tweezers) into the cryogen. The dovetail provides for a fit between the tweezers and plunger, where there is essentially no degree of freedom, i.e., the tweezers are not able to freely translate or rotate. The tweezers only move as the plunger directs the tweezers and the geometry of the dovetail intrinsically aligns the axis of the tweezers with the axis of the plunger. However, the nature of a dovetail makes it difficult to press the tweezers into the end of the plunger. The difficulty of engaging and disengaging the tweezers to and from the plunger through the dovetail is increased even more by the nature of working in the tight environment in cryogenic conditions.

Other sample preparation systems for cryogenic transmission electron microscopy utilize a spring-loaded pin on the plunger that mates with a hole in the tweezers. This spring-loaded pin is loaded such that it sits at the end of a slot into which the tweezers are slid by the user, and mates with the hole on the tweezers without any secondary user-action. The tweezers are disengaged from the plunger by the user through pressing of the ping and pulling the tweezers out of the slot. Although this provides for easy engagement and disengagement, the fit is not as secure as that of a dovetail, which can lead to disengagement during plunging and damage to the tweezers.

Furthermore, tweezers are thrust by the sample preparation system such that the sample substrate is immersed in a cryogen. The sample substrate is then manipulated by the user using the tweezers to conduct several manual steps, all of which must be conducted such that the substrate remains at cryogenic temperatures. Maintaining the substrate, and the tips of the tweezers holding the substrate, at cryogenic temperature, typically by submersion in liquid cryogen, results in the entire tweezers reaching extremely cold temperatures. Nonetheless the user must maintain careful control of the tweezers to ensure that the fragile sample is not damaged. The tweezer surfaces are often slippery, which also makes handling difficult. This can lead to discomfort to the user, potentially cold burns, and makes the process of performing the required manual steps difficult.

Currently, the tweezers utilized by commercially-available platforms for cryogenic transmission electron microscope sample preparation are positive action type tweezers. These tweezers must be squeezed when the user desires to grasp an object. During nearly the entire sample preparation process, from when a TEM grid is engaged by the tweezers to when the TEM grid is transferred into a long-term storage box post-vitrification, the tweezers must be squeezed to hold the TEM grid. The tweezers are only opened to grasp and release the TEM grid, to begin and end the vitrification workflow. The tweezers are connected to the sample preparation robot for sample processing and therefore must be designed in an assembly such that they can be held closed without constant user force. Tweezers are assembled with an "O-ring," which often is a plastic, square shaped ring that fits around the tweezers. The user places a TEM grid between the tips of the tweezers, squeezes the tweezers, and then slides the plastic O-ring over the widest part of the tweezer; the O-ring holds the tweezers in a squeezed position when it is located as such. The user then slides the O-ring out of this position to release the grid. Use of the O-ring requires 2-handed dexterity and is stressful for the user, particularly after sample vitrification. The user must use one hand to hold the tweezer tips shut, while sliding the O-ring out of place. The user must ensure that the tweezer tips and TEM grid are held immersed in the liquid cryogen while sliding the O-ring, which is difficult for users with their fingers very close to the cryogen. They must also provide enough force on the tips while disengaging the O-ring such that the sample grid is not dropped from the grasp of the tweezers and also not move the tweezers in the small cryogen cup such that the grid smashes into the wall of the cup. This mechanism leads to many dropped or damaged grids, which leads to loss of valuable sample, valuable grid materials, and user time. Reverse action tweezers are closed in the natural state, which allows for holding a TEM sample grid while eradicating the need for the O-ring. However, although reverse action tweezers remove the need for an O-ring, and they are ubiquitous in many other fields and commercially-available, they are not designed for the niche cryo-TEM sample preparation market. There are a variety of cryo-TEM sample preparation technologies, but all platforms and generations provide little clearance between arms used to hold blotting paper and blot the sample. Commercially-available reverse action tweezers are made too wide to fit into these technologies, and if they are used with these sample preparation technologies, there is risk that the reverse-action tweezers will interfere with the blotting action or crash into other parts of the preparation platform.

As fully described below, The present invention includes several parts that are assembled with tweezers to improve the ease with which the tweezers are attached to the sample preparation system plunger and to provide a surface with low heat transfer with the tweezers, providing a more physiologically comfortable temperature for the user and a tackier surface for better user grip. A sub-assembly clamp at the end of the tweezers provides a clamping mechanism which is easily opened and closed by the user. The clamp is opened by the user, allowing for easy placement over the end of the plunger. The clamp is then allowed to close over the plunger, where the geometry of the clamp forms a negative of the plunger geometry. This leads to a tight mate with the plunger, allowing no degrees of freedom and therefore no danger of the tweezers coming loose from the plunger. Furthermore, the clamp self-aligns such that the axis of the tweezer assembly aligns with the axis of the plunger of the sample preparation system. This ensures that the tips are located along—and move along—one degree of freedom, which is the axis of the plunger. When needed, the clamping mechanism of the present onvention can be easily opened to provide easy removal of the tweezer assembly from the end of the plunger.

A gripping surface is attached to each side of the tweezers, which are separated from the surface of the tweezer arm by any combination of air gaps, materials bosses, insulation materials, and so forth. This surface is therefore much warmer than the cryogenic temperature of the tweezer tips, while also minimizing the amount of heat delivered to the tweezer tips, which should remain at the cryogenic temperatures. These surfaces provide comfort to the user, allowing them to focus solely on their tasks at hand without the pain of extreme cold or burns. Furthermore, the surface provides a tack that allows for better grip for the user.

A pair of reverse action tweezers is utilized for the tweezer assembly to be used with a sample preparation system for cryogenic transmission electron microscopy, instead of positive action tweezers with an O-ring. The reverse action tweezers are designed and processed such that they are narrow enough to not interfere with the cryo-TEM sample preparation system. Within the robot, there are a variety of clearances through which the tweezers must pass as they are manipulated by the robot for sample processing. The tweezers of the present invention are designed and processed such that they can be manipulated by the robot such that there is no or minimal interference with any part of the robot, including not interfering with the blotting arms or blotting process, as to ensure that the blotting process has similar results as would be observed with positive action tweezers. With reverse action tweezers, the user no longer has to consider the O-ring or use two hands and multiple use steps in order to be able to release the grid from the tweezer's grasp and place it in long term storage. The user squeezes the reverse action tweezers after properly placing the tips of the tweezers with the TEM grid over the appropriate grid storage position, and the grid is released for storage. This provides a stress-free, ergonomic, user-friendly mechanism to transfer the TEM sample grid to storage, and will lead to fewer damaged samples and fewer lost samples, which are expensive.

In the description to follow, the plunger of the sample preparation system is shown as a male dovetail geometry. However, it should be noted that the present invention is equally applicable to other male/female geometries used for tweezer attachment to the plunger. Furthermore, in the description below, the tweezers are shown as reverse action tweezers. However, it should be noted that the present invention is equally applicable to any form of tweezers.

Figure 1:
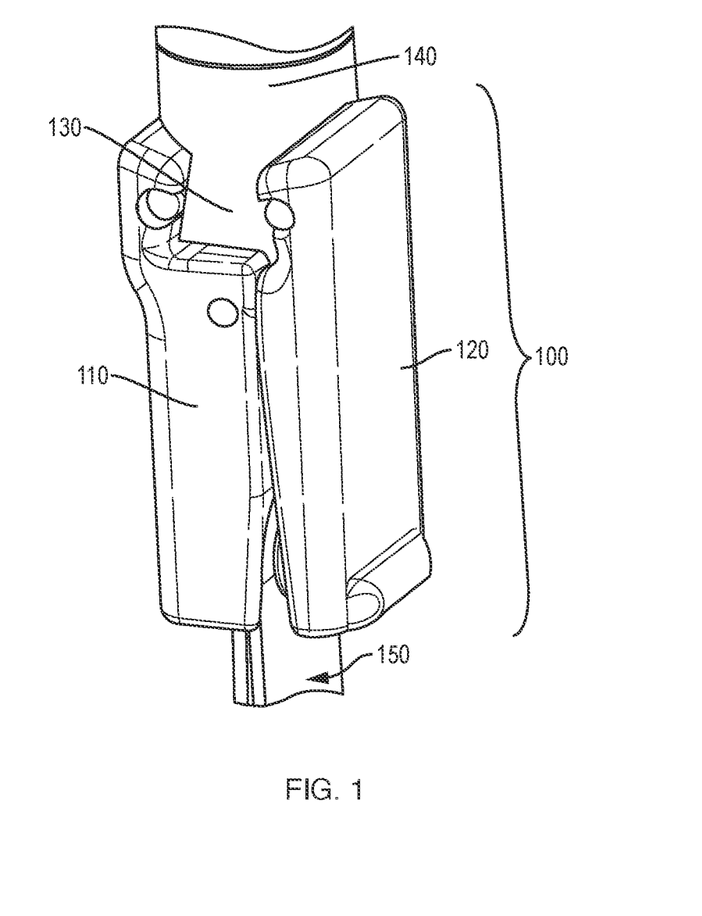
FIG. 1 is a view showing the male dovetail geometry at the end of the plunger of the cryogenic transmission electron microscope sample preparation system, and spring-loaded clamp at the end of the tweezers.

In FIG. 1, a clamp assembly 100 includes two structural components 110, 120 that assemble to form a female dovetail geometry to a male dovetail geometry 130 of a plunger 140 of a cryogenic transmission electron microscope sample preparation system. This female/male geometry forms a tight fit, leading to zero degrees of freedom. The clamp assembly 100 is attached to tweezers 150, which are reverse action tweezers in this specific embodiment.

Figure 2:
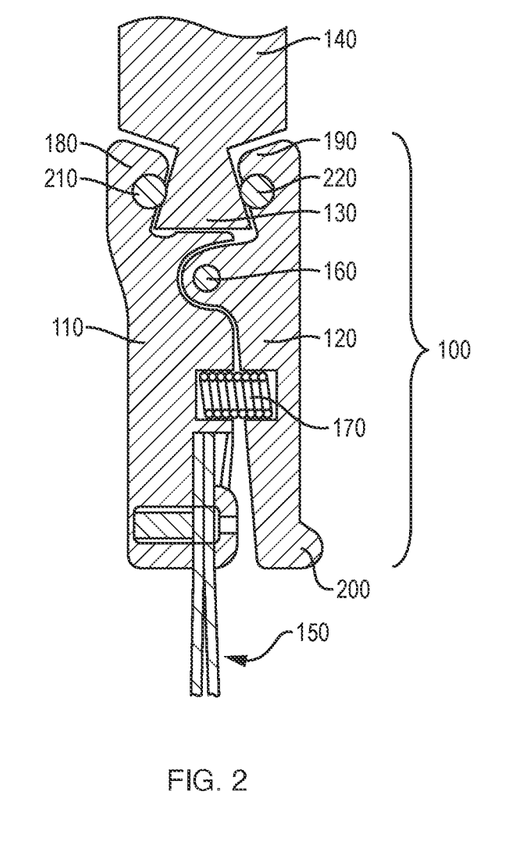
FIG. 2 is a sectional front view of the male dovetail end of the plunger mating with the natural state of the female geometry of spring-loaded clamp and tweezers.
Figure 3:
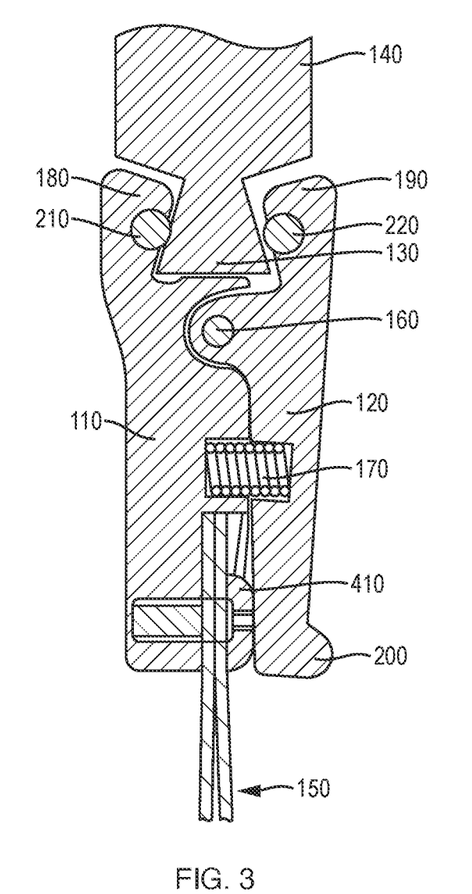
FIG. 3 is the same as FIG. 2 except with the spring-loaded clamp forced open so that the clamp is not mating with the male dovetail.

In FIG. 2, the two structural components 110, 120 of the clamp assembly 100 are held together by a pin 160, around which structural component 120 can rotate while partially nested within structural component 110. A spring 170 sits within pockets in each of the structural components 110, 120 and is compressed in a natural state, which results in spring force supplying a moment around the pin 160. This moment in the natural state leads to the tight fit of the clamp assembly 100 composed of structural components 110, 120 due to the two halves of the negative dovetail geometries 180,190, each of which forms one half of a tight negative geometry around the plunger dovetail 130. A lip 200 of structural component 120 can be pressed inwards towards structural component 110, the force of which creates a moment around the pin 160, which opposes the moment of the spring 170 around the pin 160 between the two structural components 110, 120. Upon that forced moment at the lip 200 surpassing the moment supplied by the spring 170, the structural components 110, 120 rotate such that the negative dovetail geometries 180, 190 open and the female/male dovetail geometry is no longer tight, as shown in FIG. 3. This allows for a degree of freedom where the clamp assembly 100 can slide along a length of the dovetail 130, allowing for removal of the clamp assembly 100 from the plunger 140. Pins 210, 220 provide sliding contact points for the negative dovetail geometry with the plunger dovetail 130. This pin surface provides for low friction attachment and removal of the clamp assembly 100 from the plunger 140 in this preferred embodiment, as well as provides two contact lines which lead to self-centering of the clamp assembly 100 and alignment of the axis of the tweezers 150 with the axis of the plunger 140.

Figure 4:
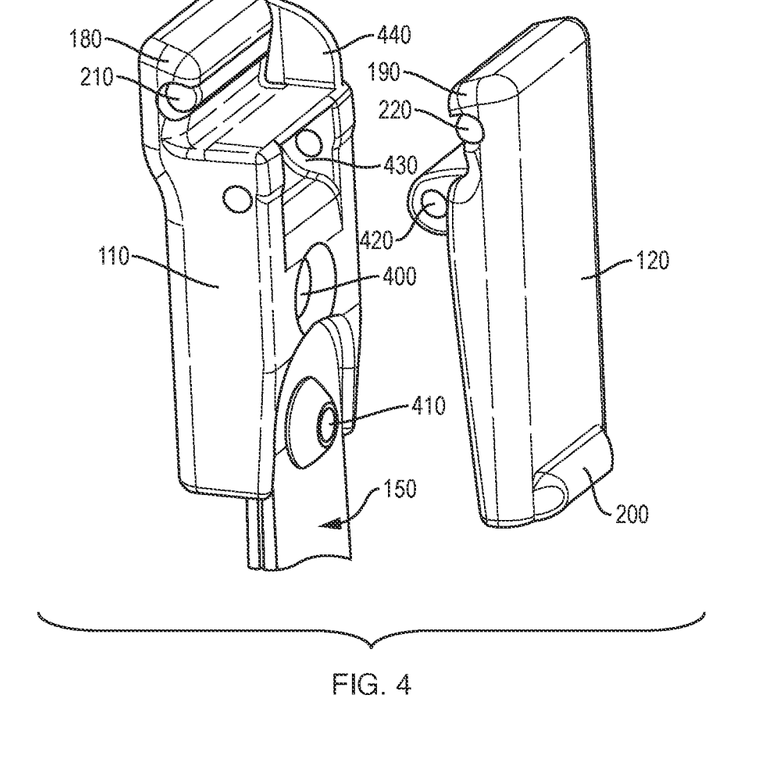
FIG. 4 is an exploded view of the spring loaded clamp, showing the two structural components of the clamp and how they mate.

As shown in FIG. 4, the spring 170 nests within a pocket 400 within structural component 110 and a corresponding pocket (not shown) in structural component 120. Applied forces to open the negative dovetail geometry formed by 180, 190 as part of the structural components 110, 120 lead to the spring 170 being compressed within those pockets. The rotation of structural component 120 around the pin 160 is stopped in this preferred embodiment by contact between the component 120 and a fastener 410 between the tweezers 150 and the structural component 110. Structural component 120 rotates around the pin 160 relative to structural component 110 through a male rotational nesting geometry 420 which nests within a female rotational nesting geometry 430 within structural component 130. A stop feature 440 provides for this preferred embodiment a position at which the negative geometry of the dovetail formed by 180 and 190, when in the open position and being slid along the male dovetail 130, is sterically inhibited from sliding any further. The stop feature 440 assures that the female dovetail feature of the clamp assembly 100 is slid the appropriate distance along the one degree of freedom along the male dovetail 130 such that the axis of the tweezers 150 is aligned with the axis of the plunger arm 140.

Figure 5:
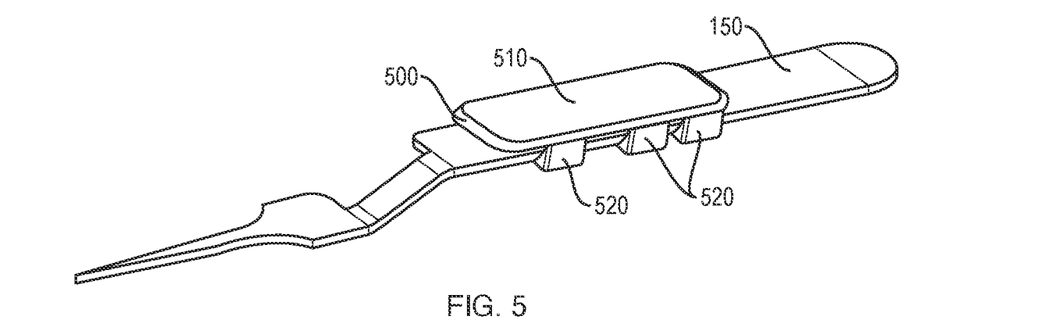
FIG. 5 is a view showing the insulating, protective grips on one half of the tweezers.

As shown in FIG. 5, thermally protective grips in this preferred embodiment are composed of a plastic frame 500 and a silicone material 510. The plastic frame 500 attaches to one half of the tweezer 150 by arms 520 that wrap around to the bottom side of the tweezer 150, both on the visible side as well as on the other side of tweezer 150. In this embodiment, the frame of the grip is fixed to the tweezer 150 through tight fit between the arms 520 along both parallel sides of the tweezer 150 and also a small amount of adhesive between the arms 520 and the tweezer 150. The silicone material 510 in this preferred embodiment provides a thickness of thermally insulating material as well as a tacky surface for improved user grip.

Figure 6:
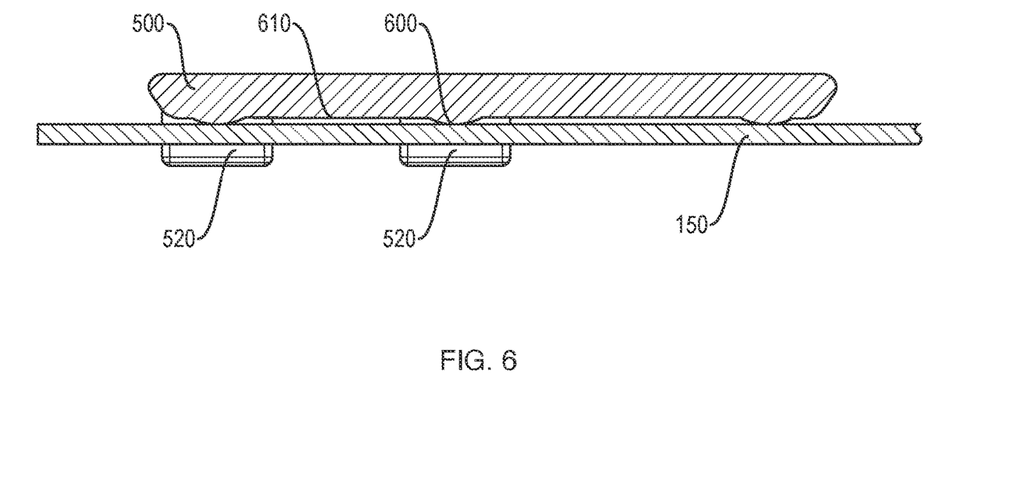
FIG. 6 is a sectional view of the insulating, protective grips on one half of the tweezers, showing the material bosses and air gaps creating thermal insulation and the snap on arms that connect the grip to the tweezers.

As shown in FIG. 6, the arms 520 of the plastic frame 500 wrap around to the bottom of tweezer 150 to provide a tight attachment between the two parts. The plastic frame 500 contacts a top surface of the tweezers 150 through minimal material bosses 600 which are meant to provide air gaps 610 between the surface of the tweezers 150 and the bottom of the plastic frame 500. This is meant to provide thermal insulation in the form of air between where the user holds the grips and the tweezer surface, such that the contact surface for the user is insulated from the cryogenic temperatures experienced by the tips of the tweezers.

Figure 7:
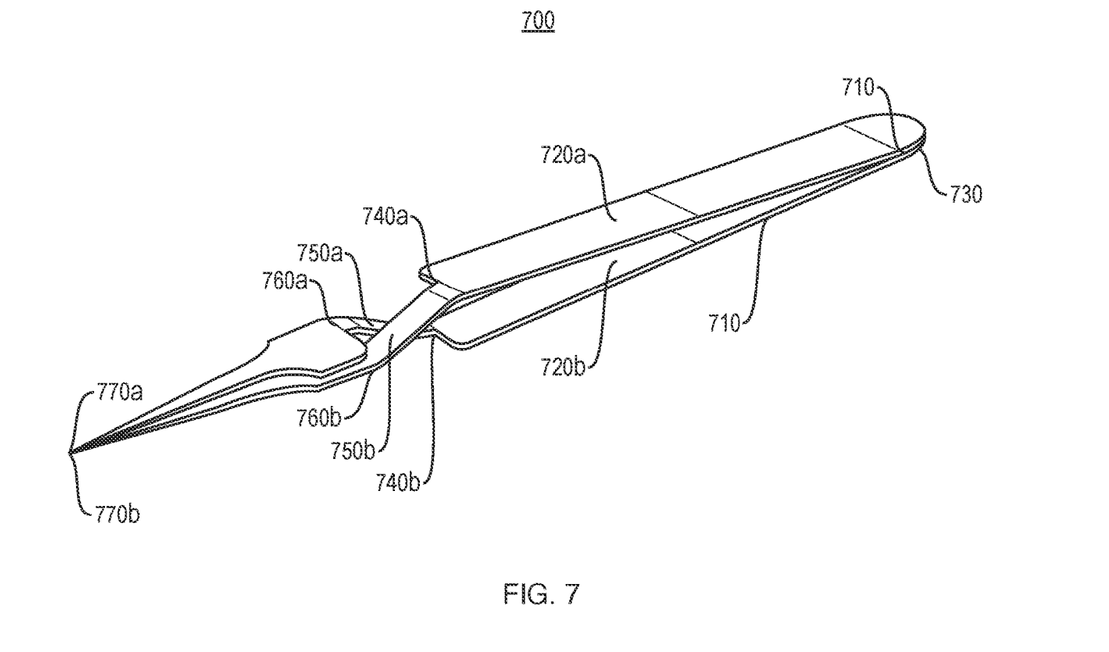
FIG. 7 is a view showing the three dimensional form of the reverse action tweezers.

In FIG. 7, exemplary reverse action tweezers 700 are composed of two identical tines 710 facing each other about a symmetry line (800 in FIG. 8) and attached to each other at the back end of each.

Each tine has a rear section 720a and 720b, where the two rear sections 720a, 720b diverge as you move further away from the attachment point 730. The rear sections 720a, 720b conclude at the widest point of the reverse tweezer assembly 740a and 740b. Each tine then has a middle section 750a and 750b which both cross back towards the other tine. The middle sections conclude at another locally wide point 760a and 760b, where the front section of each tine begins. The front sections move towards the other tine and they conclude in fine tips 770a, 770b that make contact with one another.

Figure 8:
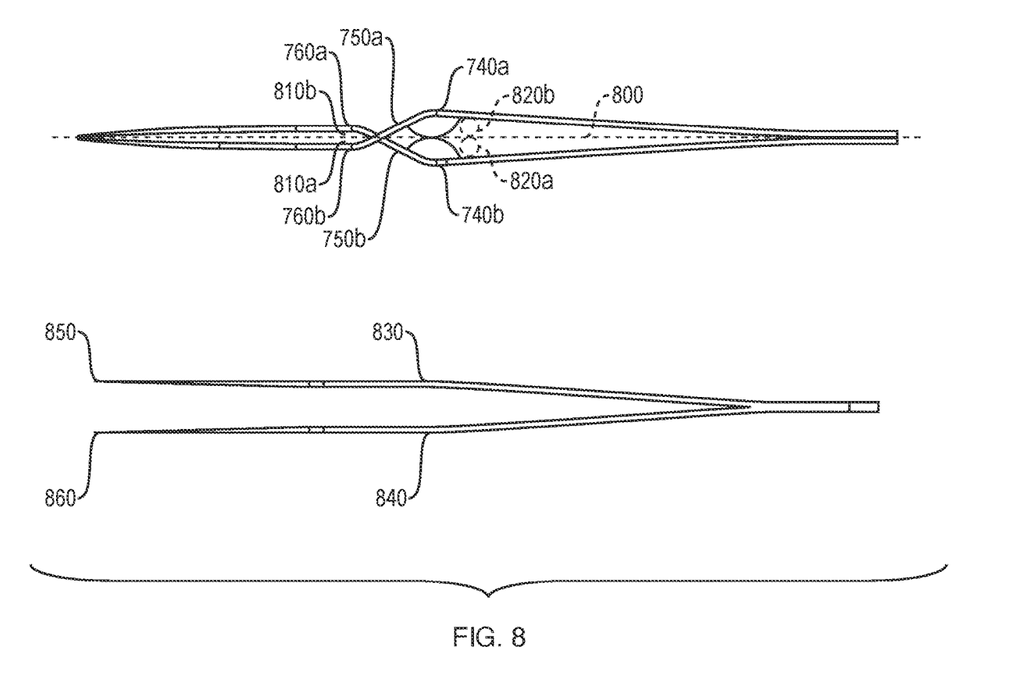
FIG. 8 is a side view showing the two dimensional cross section of reverse action tweezers and positive action tweezers.

As shown in FIG. 8, the tips 770a, 770b of the reverse tweezers are closed together in a natural state of the tweezers. A user can open the tips 770a, 770b by applying a force at the widest point 740a, 740b of the tweezers. The user can place an item between the tips 770a, 770b while applying the force and then release the force to grasp onto the item. In order to achieve compatibility of reverse tweezers with cryogenic transmission electron microscopy sample preparation systems, a gap between 740a, 740b and 760a, 760b should be no larger than a particular maximum as dictated by specifications and dimensions of the chosen sample preparation system. To modify the reverse tweezers to be no wider than those maximums, each tine is modified individually. The middle section of the tine 750a, 750b is fixed, and the front section of the tine is forced such that the angle between the middle and front sections 810a, 810b is increased. This bend will reduce the width between 760a and 760b. While the middle section 750a, 750b of the tine is fixed, the rear section of the tine 720a, 720b is forced such that the angle 820a, 820b becomes larger, which decreases the width between 740a and 740b. Reverse action tweezers are much easier for a user preparing samples for cryogenic transmission electron microscopy than positive actions tweezers, where the tweezers are naturally open and the user must squeeze the connected tines 830, 840 in order to hold the tips 850, 860 of the tweezers shut and grasp an item.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A system comprising:
   thermally protective, narrow reverse-action tweezers with a self-aligning clamp for frictionless positioning with secure connection to a sample preparation system plunger for cryogenic transmission electron microscopy,
   wherein the self-aligning clamp comprises two removable structural components that assemble to form a female dovetail geometry to a male dovetail geometry of the sample preparation system plunger.

2. The system of claim 1 wherein the two removable structural components are held together by a pin, around which one structural component can rotate while partially nested within the other structural component.

3. The system of claim 1 wherein each of the two removable structural components includes a spring sitting within a pocket that is compressed in a natural state, resulting in a spring force supplying a moment around the pin.

4. A system comprising:
   thermally protective, narrow reverse-action tweezers with a self-aligning clamp for frictionless positioning with secure connection to a sample preparation system plunger for cryogenic transmission electron microscopy,
   wherein the narrow reverse-action tweezers comprise:
     a pair of tines; and
     a gripping surface attached to each tine;
   wherein the gripping surface comprises:
     a plastic frame; and
     a silicone material providing thermal insulation and a tacky surface.

5. The system of claim 4 wherein the plastic frame is fixed to the pair of arms with an adhesive.

6. The system of claim 5 wherein the adhesive is a silicone material.

7. A system comprising:
   thermally protective, narrow reverse-action tweezers comprising a pair of tines and a gripping surface attached to each tine; and
   a self-aligning clamp for frictionless positioning with secure connection to a sample preparation system plunger for cryogenic transmission electron microscopy, the self-aligning clamp comprising two removable structural components that assemble to form a female dovetail geometry to a male dovetail geometry of a sample preparation system plunger.

8. The system of claim 7 wherein an axis of the narrow reverse-action tweezers is configured to align with an axis of the sample preparation system plunger.

9. The system of claim 7 wherein the gripping surface comprises: a plastic frame; and a silicone material providing thermal insulation and a tacky surface.

10. The system of claim 9 wherein the plastic frame is fixed to the pair of arms with an adhesive.

11. The system of claim 10 wherein the adhesive is a silicone material.

12. The system of claim 7 wherein the pair of times face each other about a symmetry line and attach to each other at a back end of each.

\* \* \* \* \*

UNITED STATES PATENT AND TRADEMARK OFFICE
CERTIFICATE OF CORRECTION

| | | |
|---|---|---|
| PATENT NO. | : 11,253,976 B2 | Page 1 of 1 |
| APPLICATION NO. | : 16/515822 | |
| DATED | : February 22, 2022 | |
| INVENTOR(S) | : Michael Philip Godfrin et al. | |

It is certified that error appears in the above-identified patent and that said Letters Patent is hereby corrected as shown below:

In the Specification

Column 1, Line 12 should read:
STATEMENT REGARDING FEDERALLY SUPPORTED RESEARCH
The invention was made with government support under Grant Nos. NSF 1746430 and 1951068 awarded by the National Science Foundation. The government has certain rights in the invention.

Signed and Sealed this
Thirtieth Day of July, 2024

Katherine Kelly Vidal
*Director of the United States Patent and Trademark Office*